United States Patent [19]
Webb

[11] 3,741,608
[45] June 26, 1973

[54] LOAD DISCHARGE CONTROL SYSTEM
[76] Inventor: William T. Webb, 4720 Buffalo Trail, Amarillo, Tex. 79109
[22] Filed: July 27, 1970
[21] Appl. No.: 58,409

[52] U.S. Cl................ 298/17 S, 298/22 P, 91/171
[51] Int. Cl............................................. B60p 1/16
[58] Field of Search............. 298/22 C, 22 P, 22 R, 298/17 S; 137/98; 91/171; 60/97 E

[56] References Cited
UNITED STATES PATENTS
3,262,740  7/1966  Stockwell ........................ 298/22 P
1,999,834  4/1935  Ernst .................................. 60/97 E Primary Examiner—Leo Friaglia
Attorney—Ely Silverman

[57] ABSTRACT

Automatic control assembly in hydraulic system for raising and lowering a loaded movable truck bed includes a floating valve and provides for selectively raising and emptying the heavier portion of the loaded truck bed and instantaneous control to provide an overall even discharge from the bed and level orientation of the load.

3 Claims, 10 Drawing Figures

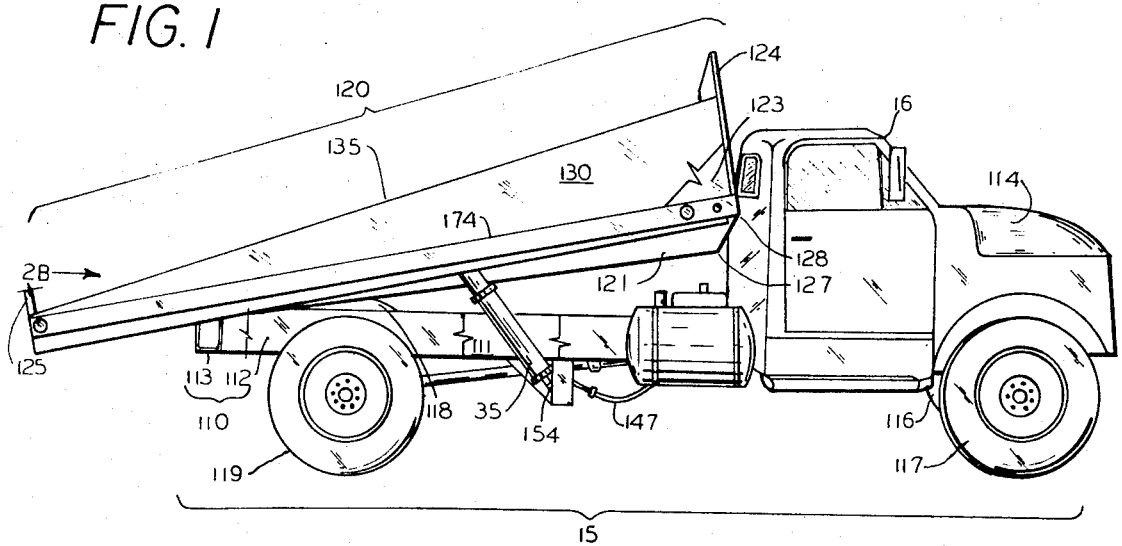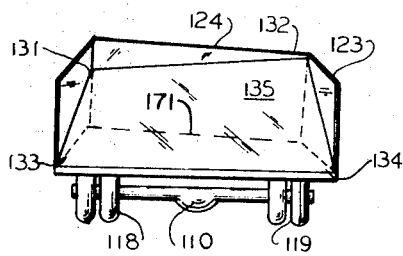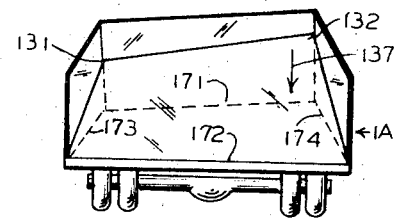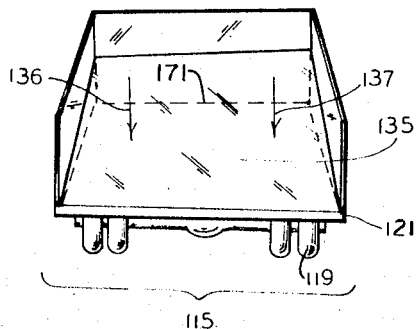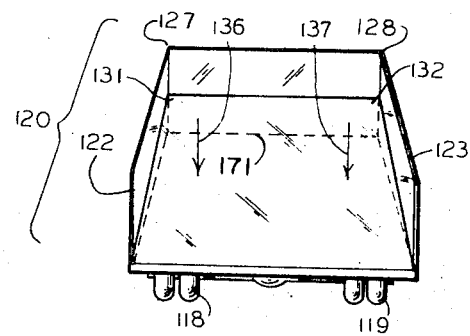
WILLIAM T. WEBB
INVENTOR.
BY Ely Silverman
ATTORNEY INVENTOR.
WILLIAM T. WEBB
BY
Ely Silverman
ATTORNEY

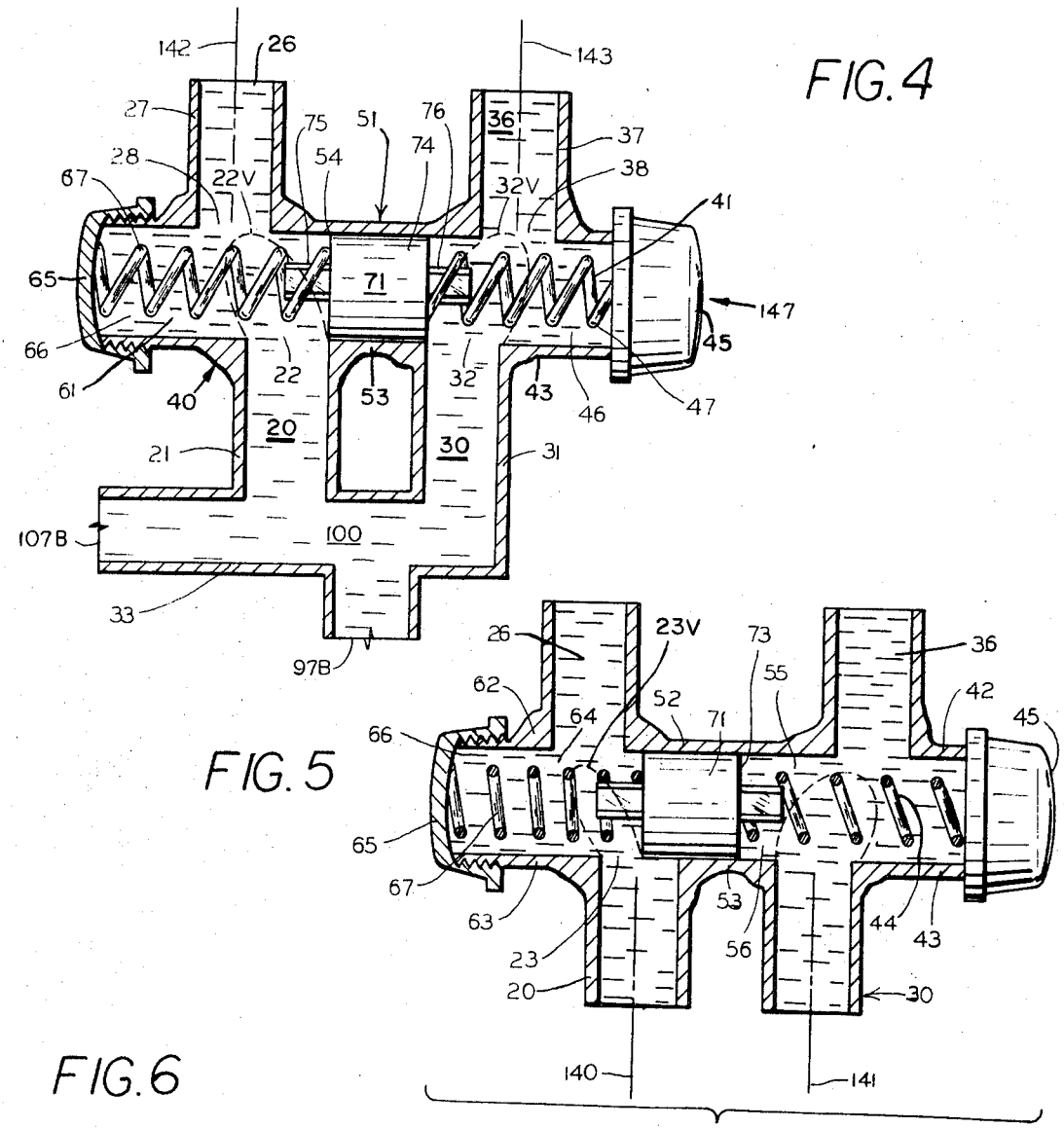
FIG.4
FIG.5
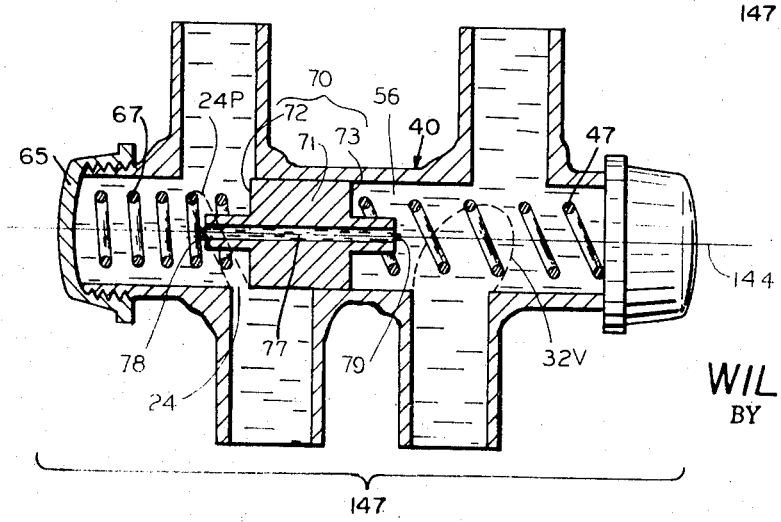
FIG.6
INVENTOR.
WILLIAM T. WEBB
BY
Ely Silverman
ATTORNEY 3,741,608

LOAD DISCHARGE CONTROL SYSTEM

BACKGROUND OF THE INVENTION

Field of the Invention is in fluid pressure operating mechanisms in land vehicles for dumping where the load receptacle is tiltable and tilting load supports.

Description of the Prior Art

Notwithstanding the importance of safety and economic factors in avoiding twisting of load receptacle during dumping there is not heretofore a simply constructed, sturdy, reliable, rapidly acting control mechanism for correcting and correding operational conditions that lead to frame twist and even dump vehicle overturning.

The apparatus of this invention has no delicate sensing parts exposed to the atmosphere wherein dumping vehicles operate nor small orifices and elements sensitive to mechanical damage as are available in the prior art; the apparatus of this invention, by using the hydraulic power lines as load weight sensing elements and as motor elements, correct the thereby sensed conditions and provides immediate correction to undesirable conditions without time delays of usual mechanical linkages as also disclosed in the prior art.

SUMMARY OF THE INVENTION

A floating valve unit in an automatic hydraulic power control system utilizes the static characteristics of the assembly to control initial floating valve movement to initially selectively apply power to the heavier portion of a movable bed on a truck, while the dynamic characteristics of the fluid coupled with the earlier positioning of the floating valve body relative to the flow of fluid through the valve unit applies different varied amount of hydraulic power to the differnet portions of the movable bed as the relative weights on the different portion of the moving bed change to avoid frame twisting due to unsymmetrical loads.

BRIEF DESCRIPTION OF THE DRAWINGS

FIG. 1 is a side view of the apparatus 15 in the position thereof shown in FIG. 2B as seen along the direction of the arrow 1A of FIG. 2B: apparatus 15 is here shown partly broken away with the frame partially removed to show location of parts of hydraulic assembly 14 and the right bed wall 123 removed to show position of parts of the load 130.

FIGS. 2A, 2B, 2C, and 2D are rear views taken along the direction of arrow 2B of FIG. 1 in a sequence of operation of the apparatus 15 illustrative of the operation of the apparatus.

FIG. 4 is a scale central vertical longitudinal sectional view of the parts of automatic control valve assembly 147 in the neutral or balanced position of floating valve 70. FIG. 5 is a sectional view as in FIG. 4 showing the part shown in FIG. 4 in an intermediate position of those parts when hydraulic liquid flow is directed primarily through the right hand channels of conduits 30 and 36 and is reduced through the left hand channels of conduits 20 and 26. FIG. 6 is a showing of the parts shown in FIGS. 4 and 5 in the position thereof at the further reduced flow through the left hand conduits and with the valve body shown in central longitudinal vertical section.

DESCRIPTION OF THE PREFERRED EMBODIMENT

Figure 3:
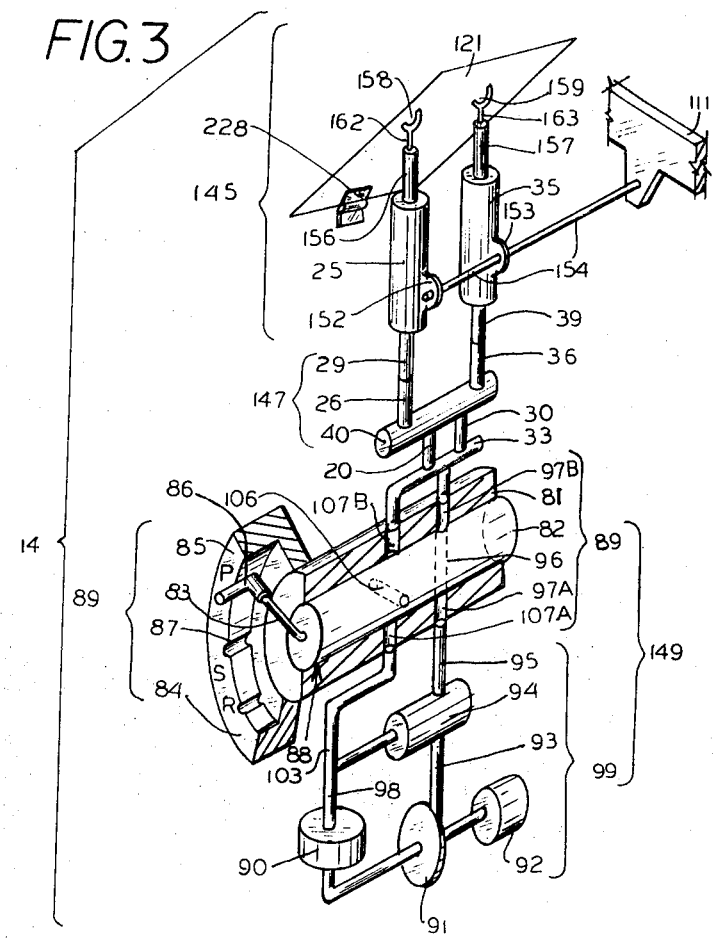
FIG. 3 is a diagrammatic representation in isometric view of the parts of the hydraulic assembly 14 and their connections.

While novelty of this invention particularly resides in the hydraulic assembly 14 thereof, the assembly 15 in which its operates—and which assembly 15 constitutes the apparatus combination of this invention—comprises an automotive truck 16, having a movable bed assembly 120 and the hydraulic piston assembly 14 in cooperative combination.

The truck assembly 16 comprises a frame 110, motor assembly 114 and wheel assembly 115. The frame 110 comprises a left longitudinal member 111 and a right longitudinal member 112 firmly joined to a rear transverse member 113 and front and middle transverse members (not shown). The frame 110 is a standard truck frame and is fairly rigid: it supports the motor 114 and is firmly supported on the wheel assembly 115. The wheel assembly comprises a front left wheel 116, a rear left wheel 118, a rear right wheel 119 and a front right wheel 117 and spring supports and axles for each such wheel.

The bed 120 is firmly yet pivotally and hingedly attached by a rear hinge 228 to the rear frame member 113. Bed 120 comprises a floor 121 and a vertical left wall 122, a vertical right wall 123, a front vertical wall 124, and a rear vertical wall 125. The walls 122 and 124 are joined at the left front corner 127 and the right vertical wall 123 is joined to the front wall 124 at the right front corner 128.

The load 130 carried on the truck has a front upper left corner 131 and a front upper right corner 132, a rear left corner 133 and a rear right corner 134 which are used herebelow to define and describe movements of material at and near the top surface 135 of such load. In operation of the apparatus portions of the load flow in lines such as 136 from the upper left corner and 137 from the upper right corner, respectively, during operation of the apparatus.

The hydraulic assembly 14 comprises a hydraulic piston assembly 145, a hydraulic automatic control valve assembly 147 and a hydraulic power assembly 149 in operative combination. The power assembly 149 comprises a manual spool valve assembly 89 and a hydraulic power assembly 99 in operative combination.

The hydraulic power assembly 99 comprises, in operative combination, a hydraulic fluid reservoir chamber 90, a hydraulic pump 91, a power take off 92 operatively attached to that pump and driven by motor 114, a discharge line 93 from the pump 91, a relief valve 94, and a high pressure line 95. The line 93 connects the outlet of the pump 91 to the inlet of the relief valve, the relief valve being operatively connected by the line 95 to inlet orifice 97A in a valve body 81. A relief line 98 is connected at one end to the overload discharge orifice of the relief valve 94 and at its other end is operatively connected to the hydraulic fluid reservoir chamber 90.

The manual spool valve assembly 89 is a standard selective flow path valve with channels in the spool and providing for three spool positions and two different flow paths therethrough and a closed position. In a preferred embodiment the manual spool valve assembly 89 comprises a fixed hollow cylindrical casing 81 and a movable cylindrical core or spool 82.

The casing or body 81 has a cylindrical interior chamber 88 in which the spool 82 closely fits and is rotatably located. The casing is provided with diametrically spaced orifices 107A and 107B and 97A and 97B.

The core or spool 82 has a cylindrical outer surface which closely matches and is co-axial with the interior cylindrical surface of casing 81 and is provided with a control arm 83 firmly attached to the body of the movable core 82. A control arm shell 84 is fixed to and peripheral of casing 81. Shell 84 is concentric with the shell casing 81 and is provided with indicia for proper location of the arm 83 and core 82 relative to shell 81. These indicia are "P" for power, "S" for stop and "R" for release, respectively. A spring-loaded lock 86 in the handle releasably yet firmly holds the control arm 83 in desired position in notches as 87 adjacent each of the indicia.

The valve core has one passage, 96, which extends, in the position of FIG. 3 wherein the arm 83 is at position P, from orifice 97A to orifice 97B and provides for passage of hydraulic liquid from the high pressure line 95 into a cross base line 33. The valve core 82 is also provided with a release channel 106, which is longitudinally spaced from and extends transverse to the direction of the channel 96 and passes through the core 82 so as to connect orifices 107A and 107B on the casing 81 when the control arm 83 is in the position indicated by the R. In the position indicated in FIG. 3 channel 96 is open and 106 is closed.

In the position of arm 83 at position S the position of the imperforate portion of casing 81 relative to the spool 82 acts to prevent passage of fluid through passage 96 and through passage 106.

The automatic control valve assembly 147 comprises, in operative combination a left inlet conduit 20, a left outlet conduit 26, a right inlet conduit 30, a right outlet conduit 36, a valve chamber 40 and a floating valve 70.

The left inlet conduit 20 has a vertical (as shown in FIGS. 4–7) cylindrical wall 21, at the top of which is a circular orifice 22. The wall 21 is firmly attached at its top to the bottom left portion of the wall 43 of the chamber 40. The left outlet conduit 26 has vertical (as shown in FIGS. 4–6) cylindrical wall 27 at the bottom of which is circular orifice 28. A flexible conduit 29 operatively connects the top of conduit 26 to the inlet of left piston cylinder assembly 25.

The right inlet conduit 30 has a vertical (as shown in FIGS. 4–6) cylindrical wall 31 at the top of which is a circular orifice 32. The wall 31 is firmly attached at its top to the bottom right portion of the wall 43 of the chamber 40. The right outlet conduit 36 has vertical (as shown in FIGS. 4–6) cylindrical wall 37 at the bottom of which is circular orifice 38. A flexible hydraulic conduit 39 operatively connects the top of conduit 36 to the inlet of a right piston cylinder assembly 35. A base pipe or conduit 33 is operatively connected to the bottoms of the conduits 20 and 30 and to the orifices 97B and 107B in valve casing 81.

The valve chamber 40 is a hollow cylindrical chamber: it is formed of a right hand valve chamber portion 41, a center valve chamber portion 51 and a left hand valve chamber portion 61. The floating piston 70 has a smooth slidable fit in the center chamber portion 51.

The right hand valve chamber portion has a top semi-cylindrical wall 42 and bottom semi-cylindrical wall 43 and a circular central orifice 44, which orifice is located at the lateral edge of the orifice 38. The lateral end of spring 47 is located against the end or cap piece 45 and is in compression and its central end bears against the right side face 73 of the valve body 71.

The left portion 61 of valve chamber 40 has top wall 62 and semi-cylindrical bottom wall 63 and a circular central orifice 64 which is located at the lateral edge of the orifice 28. The lateral end of spring 67 is located against the end or cap piece 65 and is in compression and its central end bears against the left side face 72 of the valve body 71.

The central valve chamber portion 51 is a cylindrical chamber bounded by a wall with a semi-circular top portion 52 and semi-circular bottom portion 53; a circular left orifice 54 is located at the left hand end of the bottom wall portion 53 and is tangent to the bottom inlet conduit orifice 22; a right hand circular orifice 55 is located at the right hand end of the bottom wall portion 53 and is tangent to the left hand edge of the orifice 32.

The floating valve 70 is located within this chamber or channel and fits therein with a loose (+.010 inches) sliding fit.

The floating valve 70 comprises a cylindrical body 71 with a flat left vertical (as shown in FIGS. 4–6) wall 72 and a flat vertical right wall 73 parallel to 72 and a smooth cylindrical exterior wall 74. A left stud 75 projects laterally from the wall 72 and is firmly attached thereto and a right stud 76 is firmly fixed to and projects to the right from the right wall 73. The studs 75 and 76 are located with their central longitudinal axis coincident or coaxial with the central longitudinal axis of the valve body 70. The central longitudinal axis of the body 70 is coaxial with the central longitudinal axis 144 of the cylindrical right valve chamber portion 41 and of the left valve chamber portion 61. A central channel 77 is located in the center of body 71 and studs 75 and 76 and extends from the left hand of portion of the stud 75 to the right hand edge of the stud 76 and is provided with a left end orifice 78 and a right end orifice 79 where such channel meets the left edge of the left stud and the right end of the right stud, respectively. The orifice is ⅛ inch diameter in the preferred embodiment herein described where the dimensions are as set out in Table I herebelow.

The piston cylinders 25 and 35 are attached by a bottom hinge 152 and 153 respectively to a rigid transversely extending pivot rod 154 (which is firmly attached to frame members 111 and 112) for pivotal engagement thereon. Each of piston cylinders 25 and 35 has a telescoping piston members 156 and 157; each telescoping arm or member 156 and 157 has an upper clevis 162 and 163, respectively, firmly attached thereto. Each clevis 162 and 163 is pivotally attached to a hinge base 158 and 159, respectively, each of which bases are firmly attached to the bed 120.

The hinges 158 and 159 are longitudinally equally spaced from the rear edge 172 of the bed 120. However, the hinges 158 and 159 are laterally spaced from the longitudinal center of the bed 120 hence bear different portions of the weight of the load 130 when the load 130 is not distributed evenly on both sides of the center of the bed 120.

The piston cylinders 25 and 35 are identical in size and shape.

The operation of the apparatus 15 is illustrated in FIGS. 2A, 2B, 2C, and 2D. FIG. 2A illustrates a distribution of a load of grain 130 on the truck bed 120 observed after the rear wall 125 of the bed is removed from the rear of the truck 16.

FIG. 2A shows the load on the bed which bed has not been elevated from its position resting on the truck frame. FIG. 2B shows some elevation of the front end of the bed with corrective action provided by the assembly 147. FIG. 2C shows further elevation of the front end 171 of the bed 120 when the corrective action of the assembly 147 has been in effect. FIG. 2D shows further elevation of the front end 171 of the bed 120 with substantially complete correction of the unsymmetrical loading of the bed 120. Drawings of the right hand side of the bed 174 and the right hand piston cylinder 35 are both shown on the right side in FIGS. 3 through 7 as well as in FIGS. 2A, 2B, 2C and 2D. While the following description is given for a load which is skewed because of the greater weight on the right hand side it is to be understood that the description of operation is also applicable to a load wherein a greater initial weight is located on the left hand side of the load rather than the right.

On removal of the gate 125 the rear portion of the top surface 135 of the load 130 is lowered, i.e., when the rear gate is taken from the truck the rearmost material of the load pours over the rear edge 172 of the bed 120 and accordingly a somewhat triangular longitudinal cross-section or profile is provided (as in FIG. 1) by the top surface of the load because of the removal of such rearmost portion of material in contact with the rear gate flowing off the top of the bed. Nevertheless, an excess weight is shown on the right hand side of the bed with, as shown in FIG. 2A, a depressed position of the right hand edge 174 of the bed 120.

In FIG. 2A the length of bed 120 shown is horizontal, i.e. is not raised from the frame of the truck 110, there is some skewing of the front edge 171 of the bed (front being toward the motor end of the truck 16) due to the additional weight of the load on one side of the truck and consequent yielding of the springs and/or tires because of such distribution. In this situation the front right corner 132 of surface 135 is somewhat higher than the front left corner 131 of the top surface 135 of load 130.

At the instant that the piston members are first actuated and the hinges 158 and 159 forced against the bottom of the bed there is a somewhat greater force on the right hand piston cylinder 35 than there is on 25. As piston cylinders 25 and 35 have the same internal diameter and are otherwise identical, because of the greater weight of material on the right hand side of the bed pressure in the right hand piston cylinder 35 is somewhat greater than on the left hand piston cylinder 25 and the pressure of the liquid in conduits 30 and 36 is greater than the pressure in conduits 20 and 26.

This pressure in conduits 20 and 30 is developed by motor 114 through the power take off 92 of assembly 14 which in turn powers pump 91, which pump is fed hydraulic fluid from reservoir 90, and which pump delivers hydraulic fluid under pressure to conduits 20 and 30.

The back pressure of the hydraulic fluid through the pistons 25 and 35 and their channels 26 and 36 produces a corresponding greater back pressure in the portion of the fluid contacting valve body face 73 than on 72 which causes the valve body 70 to move, as shwon in FIGS. 4–6, to the left. The rate of volume flow through the conduits 20 and 26 is accordingly then reduced because such motion of the floating valve body 70 to the left reduced the size of the orifice between the conduit 20 and the conduit 26 from the size shown as 22 in FIG. 4 to a somewhat smaller size as shown by the smaller orifice 23 in FIG. 5. Accordingly with such reduced volumetric flow through the left side conduits 20 and 26 because of such greater resistance to flow through the left side conduits 20 and 26 a relatively greater volumetric flow of hydraulic fluid is provided to the piston 25 in the bed right side than to the left side and the right side clevis 163 at top of piston 35 is moved upward at a greater rate than the left side clevis 162 at top of piston 25 proportionately to the greater weight on such piston.

Accordingly, the operation of the assembly 147 provides that the heavier corner, the front right corner 132 in this particular case, is raised more quickly than is the left front corner 131 of the load 130. The preferential raising of the corner 132 causes a more rapid discharge of the solid material from the right hand side of the load 130 than from the left hand side and instantly acts to bring the ratio of the height of the load at the left front corner and right front corner to a lesser disparity or to a greater equality. This compensates for the lack of perfect homogenity of fungible materials which in part causes different portions of a mass of a material supposedly all with an equal angle of repose to not flow equally, notwithstanding they come from the same source. The assembly 14 thus avoids twisting of the bed 120 because of any lack of uniform behavior of even supposedly uniform material.

Such lack of homogeneity also results from shifting of the material during transport by truck — due to the repeated vibrations of such material and the segregation of denser and/or finer components more to one side than to the other which causes a lack of homogeneity throughout the entire mass so that the load 130 does not, absent the corrective action of assembly as 14, flow evenly from the tilted truck even if the bottom is level; by this apparatus and process there is a compensation for the lack of equalization of the weight on each side so that even flow of discharge from the truck bed will be provided as well as a lack of twisting damage to the carrier because of such inequalities in the unloading distribution pattern of such material from a tilting truck bed.

As shown in FIG. 2C which diagrammatically illustrates the stage after that shown in 2B, because of such increased elevation of the front right corner of the bed 120, (the corner formed at the junction of front edge 171 and right edge 174 of the bed 120) relative to the front left bed corner the load 130 is more rapidly emptied from the upper right corner 132 of the load 130 than from its upper left corner 131, as there is an equalization of the height of the material in corners 131 and 132 of the load 130 at corners 127 and 128, respectively, of the bed. Accordingly continued upward motion of the front edge 171 of the bed is accomplished with an even distribution of the portion of the load 130 remaining on the bed. The above sequence is a substantially instantaneous reaction of the system 14 of this apparatus 15 and is highly desirable in this field inasmuch as the entire emptying operation occurs usually within a minute so that the corrections need to be taken care of within fractions of a second to avoid repeated twist of the frame. This structure allows a somewhat lighter frame to be used and provides a concomitant greater carrying capacity in the vehicle with equal or better safety in the unloading.

The feature of this type of system which is utilized by this above (147) control valve system is that the rate of flow through the conduits 20 and 26 and 30 and 36 is necessarily very high in order to actuate the piston cylinders as 25 and 35 inasmuch as the loads on such beds as 120 are approximately between 10 and thirty thousand pounds. For such loads a very large volume of fluid must be rapidly passed by the pump as 91. Pump 91 is powered by the power take off 92 which is in turn actuated by the motor 114 of the vehicle 16.

Accordingly as the pressures in conduit lines 20 and 30 are extremely high the rates of flow in the conduits 20 and 30 are also extremely high and the dynamic characteristics of the fluids in such conduits have control characteristic inherent therein, which are used according to this particular apparatus and process to provide a control of the movement of such pistons.

The change in size of the orifice 22 from its full opening to the partial opening thereof as shown in FIG. 5 and the still more restricted opening thereof, 24, shown in FIG. 6 provides a great effect on the amount of fluid flowing to the channel 26 from channel 20: the pressure provided by the pump 91 to the conduits 20 and 30 is the same but as the orifice 22 is reduced substantially in size (to the size of 23 and 24) the pressure drops across that orifice, because the rate of flow therepast is substantial and such fall in pressure reduces further the rate of flow from the conduit 20 to the conduit 26 as the valve body 71 is moved leftward.

The high rate of flow is utilized according to this apparatus 147 to utilize the difference in pressures in the fluid passing from conduit 20 to conduit 26. The initial velocity distribution of the fluid at orifice 32 and also at 22 is shown by the dotted lines 32V and 22V. While the static pressure due to the reaction of the load on the valve 70 above described causes an initial leftward movement of the floating valve body 70, there is also created a turbulent zone shortly after the movement of the floating valve 70 leftward; this turbulent zone is adjacent to the face 73 and extends rightward. Accordingly, the pressure which is sensed by the orifice 79 of the channel 77 is substantially that of the static pressure without any dilution by the dynamic characteristics of the fluid which is flowing from conduit 30 to 36. On the other hand, as the orifice 78 is moved leftward it moves into the zone of highest velocity of the velocity distribution curve 23V in FIG. 5 at the orifice 23 and 24P as shown in FIG. 6. The effect of the rate of flow of the liquid from conduit 20 to 26 accordingly becomes appreciable in that zone as there is a small zone, substantially in line of axis 142, of more rapid flow of fluid from conduit 20 to 26 than there is from conduit 30 to 36 and the flow due to this additional differential pressure serves to further reduce the resistance against motion of the valve body 71 to the left, and is supplemental to the overall differential pressure on face 73 of body 71 because of the greater weight of the material on the initially depressed right hand side of the bed 120. The piston 70 then reacts extremely rapidly on a relatively small differential in weight on one side (e.g.

right) of the bed relative to the other and also, after the flow has started in conduits 20 and 30 the greater rate of flow on that heavier side (right) serves to decrease the rate of flow on the other, left side, i.e. through conduits 20 and 26 because of the decrease in the orifice size (from 22 to 23) with a consequent greater pressure drop and, also, there is this additional utilization of the effect of fluid pressure drop due to the greater rate of flow through the center portion of the orifice 23 than at the periphery thereof.

Figure 7:
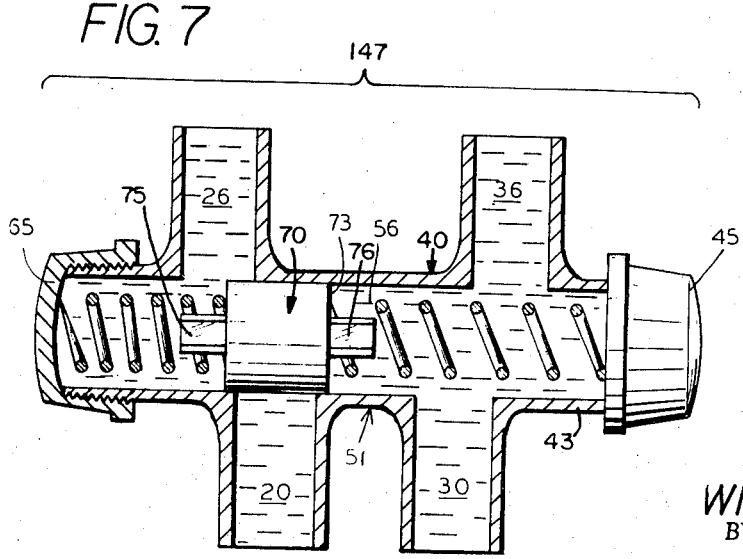
FIG. 7 is a sectional view as in FIGS. 4 and 5 showing the relationship of parts in the automatic control valve assembly 147 when the bed 120 is skewed and the handle 83 of valve assembly 189 is in its closed position.

The effect of the dynamic characteristic of the liquid flowing through the restricted orifices such as 23 and 24 is demonstrated that, when the truck body is tilted somewhat as shown in FIG. 2B and the handle 83 is moved to turn the spool 82 to its closed position as indicated by "S" on the shell 84 the truck bed stays in its skewed position and does not return to the horizontal because the valve body 71 is then moved over to the left in the position shown at FIG. 7; that is, the greater static pressure on face 73 then is undiminished by the dynamic aspect of the fluid and, with such lack of diminution of differential between the static pressure on faces 72 and 73 of the body 70 due to liquid motion, the valve body 71 is moved to the left; otherwise expressed, the drop in pressure due to pressure drop of the flowing fluid passing from orifice 32 to orifice 38 at a high rate of flow is almost as large as the pressure drop due to the smaller orifice 23 or 24; with the cessation of fluid flow such pressure drop due to motion is lost and the greater pressure on face 73 drives the valve body 71 leftward (as shown in FIGS. 4–7). However, the structure of the assembly 147 is arranged that the valve body 70 cannot move so far to the left as to preclude that fluid in the conduit 26 not have ready access to the left hand wall 72 of the body 71. Accordingly the blocked side conduit 26 is held in position and no leakage occurs past face 73 to conduit 20 from chamber 56 and, when the valve 89 is again turned to its position indicated as "P" in FIG. 3 and hydraulic fluid is again passed through the valve 89 and into the conduits 20 and 30 a high rate of flow through conduits 30 and 36 provides a pressure drop and when the resultant pressure on face 73 provides a pressure less than that of the left hand face 72 the valve 70 body is again moved to the right and the left and right side of the bed 120 move upward together, as in moving from the position shown in FIG. 2C to that of 2D.

Although the vehicle shown is a truck with an internal combustion engine and a bed tiltable about its rear end, it is understood that other type vehicles and engines and line of pivotal load attachment are within the scope of this invention, such as front end and side loaders.

The particular dimensions of the assembly 147 are exemplary, rather than limiting of the relations between parts that perform the function thereof as hereinabove described.

As above described, the function of the springs 47 and 67 is to locate the body 70 centrally (as shown in FIG. 4) during movement of the truck in transport and avoid accidental non-central location of the valve body (as in FIGS. 5, 6, or 7) prior to application of hydraulic pressure to the fluid 100 in the valve chamber 51.

The conduit lines 26 and 36 can serve as inlett conduit and conduits 20 and 30 as outlet conduits. In such case the flow from conduit 26 and conduit 20 in the position of parts shown in FIGS. 5 and 6, due to the restriction at 24, serves to urge the valve body 71 to the left to a greater degree than if such a channel 77 and orifices 78 and 79 were not present in the same manner as described for the action of the orifices 78 and 79 when flow is going upward through conduits 20 and 30 in the position shown in FIG. 4, 5, and 6.

TABLE I — DIMENSIONS OF ASSEMBLY 147 AND APPARATUS 15

| | | |
|---|---|---|
| interior diameter | 20 & 30 | ¾" |
| interior diameter | 26 & 36 | ¾" |
| interior diameter | 46, 56, 66 | 1" |
| center to center distances | 142–143 | 3" |
| | 140–141 | 1 ⅞" |
| diameter | 78, 88 | ⅛" |
| capacity | 91 | 10 g.p.m. |
| length of chamber 40 | (45–65) | 6 ½" |
| length | 75, 76 | ⅜" |
| diameter | 75, 76 | ⅜" |
| length | 72–73 | 1 ½" |
| diameter | 71 | 0.990" |
| orifice | 22–32 (Minimum Distance) | 1" |
| orifice | 28–38 (Minimum Distance) | 2 ⅛" |
| interior diameter piston cylinder | 25, 35 | 5" |
| travel of piston clevis | 158, 159 | 36" |
| width of bed 120 | | 7' 10" |
| distance 158–159 from 113 (hinge 128) | | 6' |
| distance of 158–159 from bed center line | | 2' |

I claim:

1. In an automotive vehicle with a frame and a bed, the bed having a central longitudinal axis and the bed supported pivotally on one edge of the frame,
   a. two like extensible pistons, each such piston attached at one end thereof to the bed at a point longitudinally spaced from said frame edge and, at the other end thereof at a point longitudinally spaced from said frame edge, and where one, first, extensible piston is on one one side of said axis and the other, second, extensible piston is on the other side of said axis, and a hydraulic power source is attached to said frame,
   b. said hydraulic power source having an outlet, said outlet operatively connected to said first extensible piston through a first separate conduit and to the second piston through a second separate conduit, a valve chamber connected to each of said conduits between the connection thereto of one of said pistons and the connection thereto of said pump outlet, said first and second conduits being spaced apart along the length of said valve chamber,
   c. said first conduit having a first conduit inlet portion between said pump and said valve chamber and a first conduit inlet orifice at the junction of said valve chamber and said first conduit inlet portion and said first conduit having a first conduit outlet portion between said valve chamber and said first extensible piston and a first conduit outlet orifice at the junction between said valve chamber and said first conduit outlet portion,
   d. said second conduit having a second conduit inlet portion between said pump and said valve chamber and a second conduit inlet orifice at the junction of said valve chamber and said second conduit inlet portion and said second conduit having a second conduit outlet portion between said valve chamber and said second extensible piston and a second conduit outlet orifice at the junction between said valve chamber and said second conduit outlet portion,
   e. said first inlet orifice and said second inlet orifice spaced apart along the length of said valve chamber by a first like orifice spacing distance, said first outlet orifice and said second outlet orifice spaced apart along the length of said valve chamber by a second like orifice spacing distance, said first like orifice spacing distance being different from said second like orifice spacing distance, the members of one pair of said like orifices being closer than the members of the other pair of said like orifices, said valve chamber having a uniform cross sectional area along its length between said first inlet orifice and said second inlet orifice, and said valve chamber closed laterally on both sides of the said inlet and outlet orifices,
   f. a floating valve body slidably located in said valve chamber between said first and second inlet orifices, the length of said valve body being less than the distance across the closer pair of said like orifices, and said length greater than distance across one of said orifices, the valve body in one position thereof in the valve chamber sealing one of said closer pair of like orifices more than the second member of said closer pair and, in another position thereof, sealing the second member of said closer pair of like orifices more than the first member of said closer pair, said inlet orifices having the same size and said outlet orifices having the same size, and wherein
   g. each of the first conduit inlet and outlet portions and the second conduit inlet and outlet portions and the valve chamber have a central longitudinal axis and said axes are co-planar and
   h. said inlet orifices are located on one side of said valve chamber and said outlet orifices are located on the other side thereof and
   i. the distance between the inlet orifices is greater than the width of each of said orifices and
   j. the outlet orifices are further apart than are the inlet orifices, and wherein the length of the valve body is equal to at least the distance between the first inlet orifice and said second inlet orifice, and with the center portion of the valve body located midway between the inlet orifices, on each side of the valve body a minor portion of the valve body extends parallel to the length of the valve chamber, at one side end of the valve body to above the center of the first inlet orifice and, at the other side end of the valve body a minor portion of the valve body extends parallel to the length of the valve chamber to above the center of the second inlet orifice, and a channel extends between said side ends of said valve body and has an orifice at each such side end.

2. Apparatus as in claim 1 wherein the diameter of each of said channel orifices at each of said side ends is one-eighth of the valve chamber diameter.

3. In a vehicle comprising a longitudinally and laterally extending frame and a tiltable load receptacle, the receptacle being pivotally attached to said frame near one end of said frame for tilting movement about an axis extending transversely of said frame, said receptacle having a load of material with a lighter portion and a heavier portion laterally spaced apart in said receptacle, and two extensible means attached to said receptacle at two laterally spaced apart points, and each of which points are longitudinally spaced from said axis for tilting said receptacle about said axis relative to said frame, the process which comprises the steps of
   a. pressurizing a liquid and passing said liquid through a common reservoir and then passing separate portions of said liquid through each of two separate paths into and through and out of said valve chamber to each of said extensible means, the direction of each separate path of liquid out of said chamber being different from the direction of each said separate path of liquid into said chamber, each of said portions forming a stream, and passing one of said streams of flowing liquid through each of said separate paths to each of said extensible means to exert differing upward forces at each of said two laterally spaced apart points on said receptacle, and
   b. applying the pressure transverse to the direction of flow of each of the said streams flowing through said valve chamber to each of said extensible means onto opposite sides of a movable valve body in said chamber and moving said valve body in said chamber responsive to the difference in pressure of said streams in said chamber, and throttling the flow of liquid passing through said chamber in one of said paths by said movement of said movable valve body into said one path and thereby tilting the load bearing receptacle about said axis and raising the heavier portion of the load at a faster rate than the rate at which the lighter portion of the load is raised and thereby emptying said tiltable load receptacle, and also wherein the flowing liquid is a hydraulic liquid and the throttling of the flow of liquid in one of said paths develops a lower pressure than a portion of the liquid in said other path and liquid is passed to said portion of lower pressure in said one path from the other path through the valve body, and, further wherein said valve body has side ends and a channel extends between said side ends of said valve body and has an orifice at each such side end.

* * * * *